United States Patent Office 3,583,052
Patented June 8, 1971

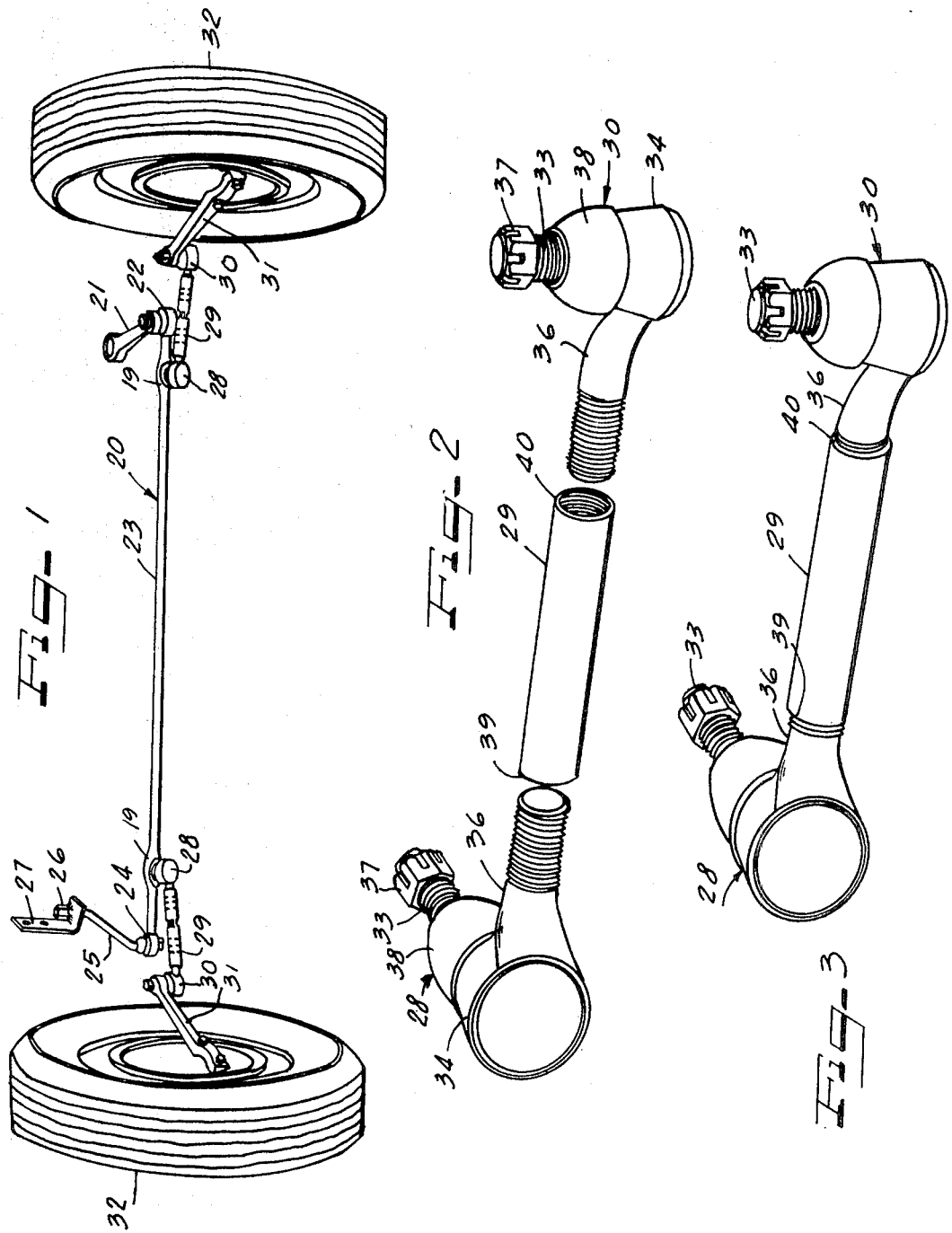

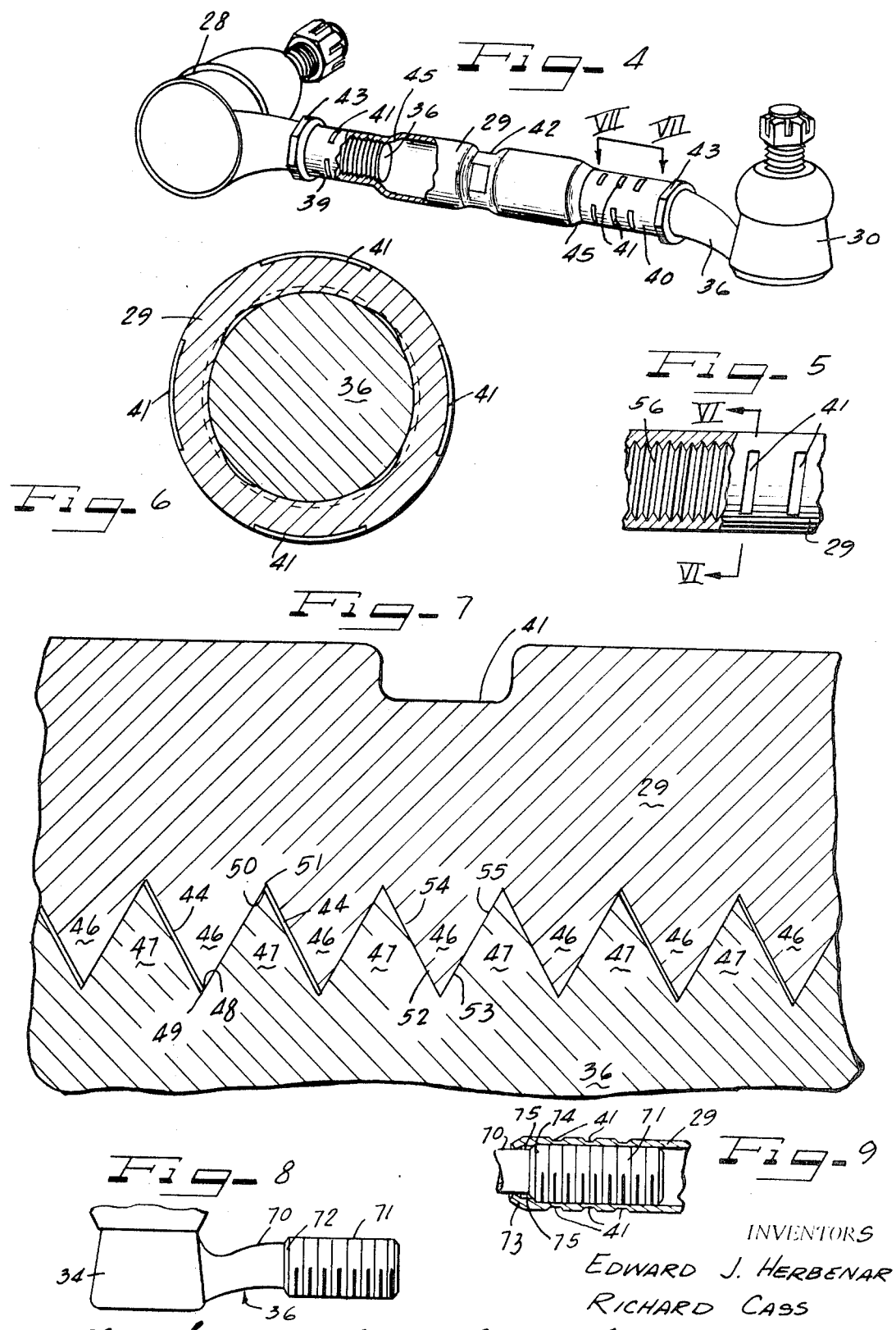

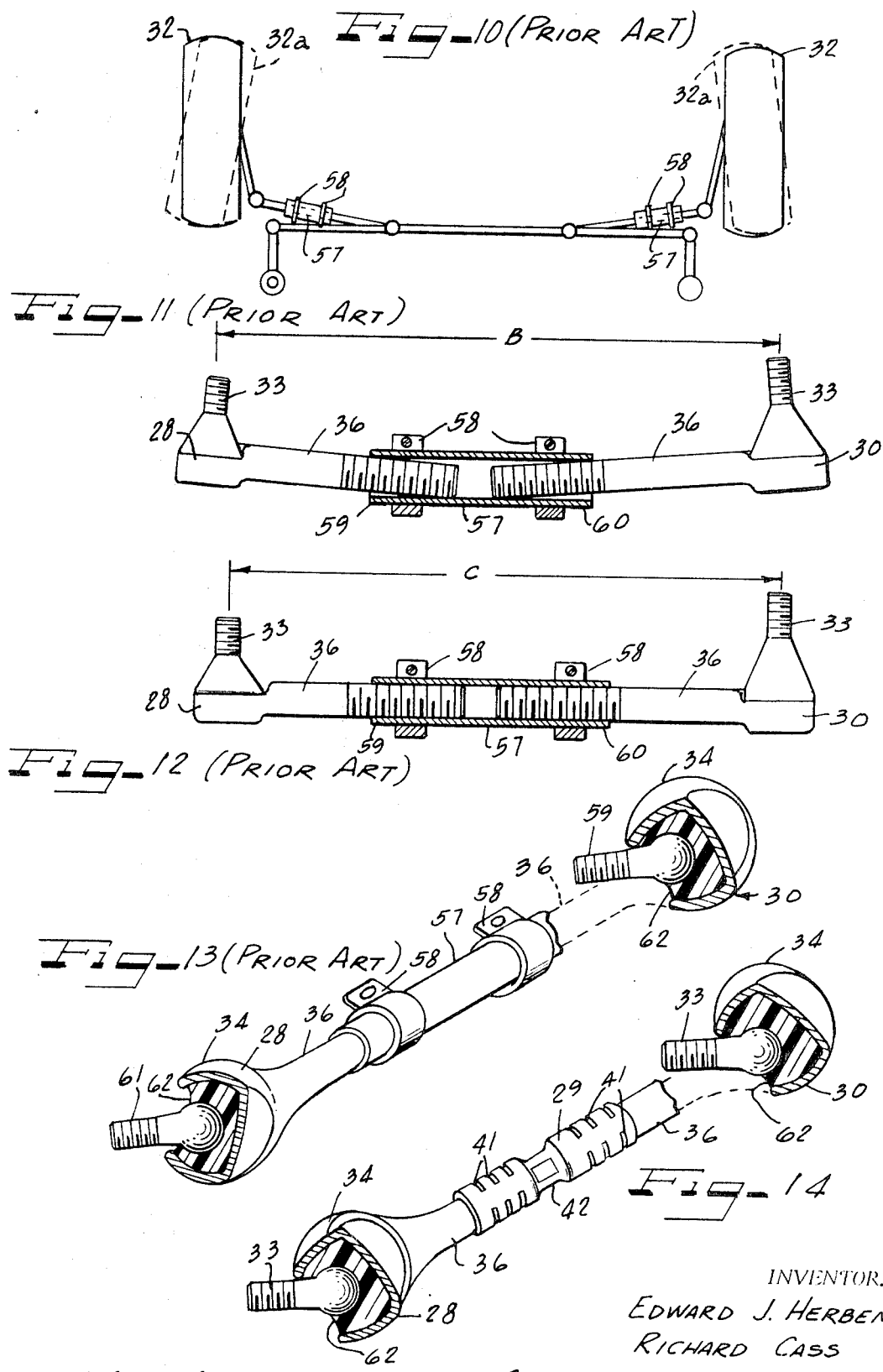

3,583,052
METHOD OF MANUFACTURE AND USE OF STAKED TURNBUCKLE ASSEMBLY
Edward J. Herbenar, Detroit, and Richard Cass, Birmingham, Mich., assignors to TRW Inc., Cleveland, Ohio
Continuation of application Ser. No. 621,559, Mar. 8, 1967. This application Mar. 11, 1969, Ser. No. 806,784
Int. Cl. B23p *13/00*
U.S. Cl. 29—175                                5 Claims

ABSTRACT OF THE DISCLOSURE

An internally threaded turnbuckle with threads of opposite hand at either end for use in adjusting the steering linkage of a vehicle which has stakes or depressions impressed on its outer circumference after the appropriate linkage assembly has been threaded into it. The stakes are preferably formed in line with the pitch of the internal thread of the turnbuckle and effectively change the major and minor diameters thereof without damaging the thread. The change of thread diameters increases to a controlled degree, the torque necessary to adjust the linkage without destruction of the threads.

This is a continuation of application Ser. No. 621,559, filed Mar. 8, 1967.

BACKGROUND OF THE INVENTION

Field of the invention

The invention relates to turnbuckles and more specifically to turnbuckles for use in adjustable steering linkages for vehicles. The invention provides a turnbuckle which has major and minor diameters of its internal thread selectively changed without damage to the thread by external stakes. These stakes selectively increase the torque required to adjust the turnbuckle assembly and maintain a controlled level of torque necessary for adjustment which is above the turning forces encountered by the assembly in use.

Prior art

The use of turnbuckles in adjustable length linkages is known in the art. However, where such linkages are to be used under adverse conditions, such as vibration, it is necessary to increase the turnbuckle's resistance to uncontrolled turning which would change the length of the linkage. Heretofore, it has been known to split the turnbuckle axially in from its open ends and to increase the torque necessary to turn the turnbuckle by the use of circumferential clamps, set screws or the like.

Staking of connections is also known to the art. Such prior art staking is either done after the components have been connected in which case the staking makes a fixed non-adjustable connection or it is done to one of the components to be connected prior to connection in which case the connection may be adjusted. In the latter case, however, assembly of the male and female threaded components is hindered by the staking and the changes produced in the female threads of the staked component, which changes are necessary to produce the desired result, are either destroyed by the male threads or will destroy the male threads.

SUMMARY

This invention pertains to a prevailing torque, self-locking turnbuckle. The turnbuckle of this invention initially is a plain cylindrical tube internally threaded at each end with threads of opposite hand. The male threaded ends of the components to be linked by the turnbuckle, are then threaded into the respective ends of the turnbuckle and the assembly is then adjusted to the desired length.

Thereafter, two or more circumferentially spaced rows of stakes or depressions are impressed into the outside circumferential face of the turnbuckle at the ends thereof. The stakes or depressions are preferably aligned with the helix angle of the internal thread of the turnbuckle.

The stakes or depressions effectively change the major and minor diameters of the female thread of the turnbuckle without destroying the thread. This change in thread diameter effectively seats the thread crests of the component assemblies tightly in the grooves of the thread of the turnbuckle and the thread crests of the turnbuckle tightly in the grooves of the component assemblies at the stake points. This tighter seating increases the torque necessary to advance or retreat the male threads in the female threads.

The amount of increased torque necessary to adjust the component linkage can be selectively determined by adjusting the depth of the deformations or by placing the deformations at an angle different than the helix angle of the female thread of the turnbuckle.

ON THE DRAWINGS

FIG. 1 is a perspective view of a parallelogram solid center-link automobile steering linkage incorporating the principles of the present invention;

FIG. 2 is an exploded perspective view of a ball joint tie-rod linkage;

FIG. 3 is a perspective view of the components of FIG. 2 in linkage relation;

FIG. 4 is a perspective view of a ball joint tie-rod linkage embodying the principles of the present invention with a portion broken away to show underlying portions thereof;

FIG. 5 is a fragmentary plan view of a turnbuckle embodying the principles of the present invention with a portion thereof broken away;

FIG. 6 is an enlarged cross-sectional view taken along the line VI—VI of FIG. 5;

FIG. 7 is an enlarged fragmentary cross-sectional view taken along the line VII—VII of FIG. 4 showing the mating of the male and female threads of the component assemblies of FIG. 4;

FIG. 8 is a fragmentary plan view of a ball joint with an expanded diameter threaded stem portion;

FIG. 9 is a fragmentary view of a turnbuckle embodying the principles of the present invention with the turnbuckle portion in cross-section showing the enlarged diameter threaded stem portion threaded therein;

FIG. 10 is a top plan view of a prior art parallelogram automobile steering linkage showing the wheels in normal operating position and by means of broken lines in misaligned position;

FIG. 11 is a cross-sectional view of a prior art ball joint tie-rod linkage in loose adjustable assembly;

FIG. 12 is a cross-sectional view of the prior art ball joint tie-rod linkage of FIG. 9 in tightened adjusted assembly;

FIG. 13 is a perspective view of a prior art ball joint tie-rod linkage with portions thereof broken away to show underlying portions; and FIG. 14 is a perpective view of a ball joint tie-rod linkage utilizing the principles of the present invention with portions thereof broken away to show the underlying portions thereof.

DESCRIPTION OF THE PREFERRED EMBODIMENTS

The principles of this invention will be described as embodied in a turnbuckle used in an adjustable tie-rod which is part of the steering linkage of a vehicle.

In FIG. 1 the reference numeral 20 refers generally to a parallelogram steering linkage. The linkage 20 consists of a pitman arm 21 connected at one of its ends to the steering gear box of a vehicle (not shown). At the other end, the pitman arm 21 is connected to a ball joint 22 which is integral with a center-link 23, which extends across the width of the vehicle. The other end of the center-link 23 has a ball joint 24 integral with it. The ball joint 24 is connected to an idler arm 25 which in turn is connected through a bushing 26 to a bracket 27 secured to the frame of the vehicle.

Ball joints 28 are fastened to the center-link 23 at spaced points 19 from the ends thereof. The ball joints 28 are connected to adjusting turnbuckles 29. The other ends of the adjusting turnbuckles 29 are connected to ball joints 30. The ball joints 30 are in turn connected to the wheel steering arms 31 which are attached to the steerable wheels 32 of the vehicle. The combination of the two ball joints 28 and 30 and the connecting adjusting turnbuckles 29 is referred to as a tie-rod assembly.

As shown in FIGS. 2 and 3, the ball joints 28 and 30 have movable studs 33 secured in housings or sockets 34. The movable studs 33 are tiltable and rotatable relative to the housings 34. Stems 36 are integral with the housings 34 and project therefrom at substantially right angles to the movable studs 33. The movable studs 33 are threaded to receive castellated nuts 37 thereon. The connection between the studs 33 and the housings 34 is protected by flexible dust cap 38.

The stems 36 are threaded, the threads of the stem of the ball joint 30 being of one hand while the threads of the stem of the ball joint 28 are of the other hand.

In the tie rod assembly, the joints 28 and 30 are connected by a turnbuckle 29 which has threads of opposite hand extending axially inwardly from opposite ends thereof.

With the stems 36 of the ball joints 28 and 30 threaded into the respective ends 39 and 40 of the turnbuckle 29, turning the turnbuckle in one direction will cause the ball joints 28 and 30 to be drawn together; whereas, turning the turnbuckle 29 in the other direction will cause the ball joints 28 and 30 to be forced apart.

FIG. 3 shows an assembled tie rod with the stems 36 of the ball joints 28 and 30 threaded into the respective ends 39 and 40 of the adjusting turnbuckle 29. In a standard tie rod assembly, the stud 33 of the turnbuckle 28 usually lies in a plane 90° from the plane of the stud 33 of the ball joint 30.

After the tie rod has been assembled, it is adjusted by turning the turnbuckle until the ball joints 28 and 30 are separated the desired distance. As shown in FIG. 4, according to the teachings of this invention, in order to prevent further accidental turning of the turnbuckle 29, which turning would result in a change in the distance between the ball joint 28 and the ball joint 30, stakes or depressions 41 are formed along the outer circumference of the turnbuckle 29. The stakes 41 are formed in that portion of the turnbuckle 29 which surrounds the threaded stems 36 of the ball joints 28 and 30. Thus, the stakes 41 are formed near the ends 39 and 40 of the turnbuckle 29 leaving the center portion of the turnbuckle unstaked. The stakes 41 are preferably formed in axial rows equally spaced circumferentially around the turnbuckle 29. Thus, in the preferred embodiment, there are four axial rows equally spaced around the circumference of the turnbuckle 29, each axial row consisting of three stakes. It is to be understood, however, that a greater or lesser number of rows of stakes, or stakes per row, could be provided.

The center portion of the turnbuckle may be of greater diameter than the end portions surrounding the stems 36 allowing the internal thread of the turnbuckle to run out naturally at the points 45 where the interior diameter of the turnbuckle becomes greater than the major diameter of the thread.

The center of the turnbuckle 29 is forged into two or more opposed parallel faces 42 suitable for gripping by a wrench or the like to facilitate turning of the turnbuckle.

Lock nuts 43 may be provided on the stems 36 at the ends 39 and 40 of the turnbuckle 29 as an aid in preventing turning of the turnbuckle 29.

As shown in FIG. 6, the stakes 41 are preferably equally spaced around the circumference of the turnbuckle 29 and are of even number so as to be positioned opposite each other. The stakes 41 are of shallow radial depth.

In the normal engagement between a male threaded member and a female threaded member the cresting threads of one member do not completely fill the root grooves of the other member. As shown in FIG. 7, in such a mating engagement, there is a gap 44 along the unloaded face of the threads between the teeth 46 of the turnbuckle 29 and the teeth 47 of the studs 36 of the ball joints. Also, the crest 48 of the teeth 46 does not bottom in the root 49 of the teeth 47. Further, the crest 50 of the teeth 47 does not bottom in the root 51 of the teeth 46.

The formation of the stakes 41 along the outer periphery of the turnbuckle 29 decreases the major and minor diameters of the female threads of the turnbuckle 29. This change in the diameters of the threads causes the teeth 47 of the stems 36 to tightly engage the teeth 46 of the turnbuckle 29 in an area radially inward from the stake 41 in such a manner that the gaps 44 in that area are closed. Thus, the stakes 41 cause the faces 52 and 53 of the teeth 47 of the male threaded stationary arm 36 to engage the faces 54 and 55 of the teeth 46 of the female threaded turnbuckle 29. This engagement of the faces 52 and 53 with the faces 54 and 55 increases the frictional resistance to the turning of the turnbuckle 29 around the stems 36, thereby increasing the torque force which must be applied to the turnbuckle 29, to turn it.

Although the stakes 41 change the major and minor diameters of the female thread of the turnbuckle 29 they do not destroy the thread and further adjustment of the tie-rod linkage by means of the application of sufficient torque to the turnbuckle to cause it to rotate around the stems 36 will not result in the cutting of new threads on the interior of the tunrbuckle or on the exterior of the stems 36.

The stakes 41 can be formed on the outer periphery of the turnbuckle in various positions. However, as shown in FIG. 5, in the preferred embodiment the stakes encircle the turnbuckle 29 in a helix identical to the helix of the female threads 56 of the turnbuckle 29. The desired amount of torque effort required to move the female thread in the turnbuckle to the male thread of the stationary arm 36 can be selectively achieved by varying the radial depth of the stakes 41, by changing the helix of the stakes 41 to a helix different from the helix of the threads 56, either to a helix with a different lead but the same advance direction as the threads or a helix with an advance direction opposite the advance direction of the helix of the threads, or by forming the stakes 41 parallel to the symmetrical axis of the turnbuckle 29, or so otherwise dimensioned. Because the stakes 41 are formed in the turnbuckle 29 after the stems 36 have been threaded into the turnbuckle 29, the prevailing torque existent between the male threads of the stems 36 and the female threads of the turnbuckle 29 can also be selectively increased by changing the depth of the stakes 41 to a predetermined point where the major and minor diameters of the male threads of the stems 36 are also changed without destroying either the female threads of the turnbuckle 29 or the male threads of the stems 36.

In the embodiment shown in FIGS. 8 and 9, in order to prevent the stems of the ball joints 28 and 30 from separating completely from the turnbuckle 29, either during adjustment of the tie rod linkage or during operation of the vehicle, the portion 70 of the stem 36 between the housing 34 of the ball joint and the threaded portion 71 of the stem 36 is of a lesser diameter than the threaded end portion 71. In the embodiment shown, the smaller diameter portion 70 is integral with the threaded portion 71 through a frusto-conical lip 72. However, it is to be understood that a tapering of the diameter such as provided by a frusto-conical lip is not necessary.

As shown in FIG. 9, after the threaded portion 71 of the stem is threaded into the turnbuckle 29, the assembly is adjusted to its desired length. After adjusting, a marginal portion of the end 73 of the turnbuckle extends axially beyond the end 74 of the threaded portion 71 of the stem and encircles, in a radially spaced relation, a portion of the lesser diameter portion 70 of the stem 36. The axially outermost portion of the end 73 of the turnbuckle 29 is then crimped radially inward around its circumference. This crimping may be done at the same time the stakes 41 are formed in the circumferential surface of the turnbuckle 29. The effect of the crimping of the end 73 is to reduce the interior diameter of the crimped portion to a diameter less than the diameter of the threaded portion 71 of the stem 36. After crimping, there remains a space 75 between the lesser diameter crimped portion of the end 73 of the turnbuckle and the end 74 of the threaded portion 71 of the stem 36. The space 75 allows further adjustment of the stem 36 in the turnbuckle 29.

The lessening of the diameter of the end 73 of the turnbuckle 29 prevents the threaded portion 71 of the stem 36 from being unthreaded from the turnbuckle 29 at that end. In the preferred embodiment, the combination of an expanded diameter threaded portion and a crimped end of the turnbuckle is used only on one end of the turnbuckle. However, it is to be understood that two such expanded diameter threaded portions can be used with both ends of the turnbuckle crimped. Further, it is to be understood that the end 73 of the turnbuckle 29 may be crimped only at selected points around its circumference rather than around the entirety of the circumference.

The staked turnbuckle of this invention is particularly advantageous for use in automobile steering linkages because of the desirability of providing adjustable couplings in such linkages. As shown in FIG. 8, it is desirable that the steerable wheels 32 of a vehicle under normal operating conditions be in parallel relationship to each other. It is, however, possible for the wheels of a vehicle to work their way into excessve non-parallel relation, either toed-in, as shown by broken lines 32a, or toed-out. When this occurs, it is desirable to be able to adjust the steering linkage so as to bring the wheels back into parallel relation. The normal method of adjustment is by providing one or more turnbuckles at some point in the linkage, generally on the tie rods. By adjusting these turnbuckles, the length of the tie rod is either increased or decreased, thereby turning the wheel either in or out.

The prior art turnbuckle 57 used in automobile steering linkages had split ends created by circumferential gaps extending axially in from the ends of the turnbuckles. In order to keep the turnbuckle from turning during operation of the vehicle, circumferential clamps 58 were placed around the split ends of the turnbuckles 57 and tightened thereon. The tightening of the clamps 58 compressed the turnbuckle 57 into tight frictional circumferential engagement around the stems 36 of the ball joints 28 and 30. The use of such clamps added weight to the steering linkage and increased the difficulty of installing and adjusting the tie rods.

Furthermore, tightening the clamps could effectively change the length of the tie rods, thereby changing the angle of the wheel. This is diagrammatically illustrated in FIGS. 10 and 11. As shown in FIG. 11, when the clamps 58 are loose around the turnbuckle 57, the split ends 59 and 60 of the turnbuckle tend to spread allowing the stems 36 of the ball joints 28 and 30 to become cocked in the turnbuckle 57.

In adjusting such prior art steering linkages, the turnbuckle 57 is adjusted until the desired distance is reached between the studs 33 of the ball joints 28 and 30. Such desired distance is illustrated in FIG. 11 as the distance B. However, as shown in FIG. 12, when the clamps 58 are thereafter tightened around the split ends 59 and 60 of the turnbuckle 57, the stems 36 of the ball joints 28 and 30 are drawn into line on the same plane. This effectively increases the distance between the studs 33 of the ball joints 28 and 30. This increased distance being illustrated by the line C in FIG. 12. This change in distance from B to C changes the angle of the wheels 32. This deficiency of the prior art is overcome by the present invention by obviating the need for a split ended turnbuckle. The staked turnbuckle of the present invention cannot circumferentially expand and, therefore, the socket assemblies cannot become cocked when combined into a tie rod assembly by the staked turnbuckle.

Another deficiency of the prior art is illustrated in FIG. 13. With circumferential clamps 58 loosened around the split end turnbuckle 57, the studs 33 of the ball joints 28 and 30 can misalign themselves. This is shown in FIG. 13 where the stud 59 of the ball joint 30 is in contact with the housing 34 of the ball joint 30 on one side of the throat opening 62 thereof, while the stud 61 of the ball joint 28 is in contact with the housing 34 of ball joint 28 at a point on the throat opening 62 opposite the point of contact of the stud 59. During the adjustment of the turnbuckle 57, the torque required to turn it in relation to the stems 36 is low and the misalignment of the studs 59 and 61 may not be corrected. After the circumferential clamps 58 are tightened, the misalignment becomes permanent, and the stud angular travel will be severely restricted in one direction.

This deficiency of the prior art is overcome by the staked turnbuckle of the present invention shown in FIG. 14 in that the torque necessary to turn the turnbuckle 29 in relation to the stems 36 of the ball joints 28 and 30 is sufficiently great to cause the studs 33 of ball joints 28 and 30 to contact the housings 34 at the same point on the throat openings 62 of the ball joints 28 and 30. After adjustment of the turnbuckle 29, during suspension and steering of the vehicle, the studs 33 will angularly center themselves, thereby providing sufficient clearance between the studs 33 and the socket throats 62.

From the above description it will be understood that our invention provides a turnbuckle having internal threads of opposite hand at each end thereof with depressions or stakes formed in the outer periphery of the turnbuckle. These stakes or depressions are effective to change the major and minor diameters of the internal threads of the turnbuckle without destroying those threads, thereby selectively increasing the prevailing torque existent between the female thread of the turnbuckle and the male thread of the components to be connected by the turnbuckle.

From the foregoing, it will be readily observed that numerous variations and modifications may be effected without departing from the spirit and scope of the novel concepts and principles of this invention. We, therefore, intend to cover all such modifications and variations as fall within the true spirit and scope of the novel concepts and principles of our invention.

We claim as our invention:

1. The method of selectively increasing the torque necessary to turn an internally threaded turnbuckle circumferentially around the externally threaded portions of two members coupled by said turnbuckle which comprises: threading the externally threaded portions of the said members into the internally threaded turnbuckle at either end thereof, forming a plurality of relatively shallow depressions in the outside circumferential perimeter of the said turnbuckle at selected points located radially outward from the threaded portions of said members, said depressions being effective to decrease the major and minor diameters of selected portions of the internal threads of said turnbuckle while maintaining the pitch of said threads, thereby selectively increasing the frictional engagement between the external threads of said members and the internal threads of said turnbuckle without destroying either of said threads, the said depressions being non-circular and having their major axis aligned with the pitch of the internal threads.

2. The method of claim 1, wherein the major and minor diameters of selected portions of the internal threads of the turnbuckle and the major and minor diameters of the portions of the threads of the externally threaded portions of the members are decreased by forming the depressions to a relatively greater depth.

3. The method of adjusting the steering linkage of a vehicle to align the dirigible wheels of the vehicle which comprises: providing threaded turnbuckles in the steering linkage which will adjust the effective length thereof between the wheels, decreasing the major and minor diameters of localized portions of the turnbuckle thread while maintaining the pitch thereof to develop a controlled torque resistance to rotation of the turnbuckle in excess of the rotational torque that can be encountered in use of the linkage, and applying torque in excess of said developed torque resistance to vary the length of the linkage as required for aligning the wheels, the major and minor diameters decreased by shallow depressions impressed in the outside of the turnbuckle, the depressions being non-circular and having their major axis aligned with the pitch of the turnbuckle thread.

4. The method of manufacturing a controlled torque turnbuckle assembly from a tube and two threaded rod end members which comprises: providing a female thread in said tube from opposite ends thereof, the thread being of differing hands for each end and said thread being compatible with the thread of the rod ends, threading the externally threaded portions of said rod ends into the internally threaded tube at either end thereof, after threading said portions into said tube forming a plurality of relatively shallow depressions on the outside circumferential perimeter of the said tube at selected points located radially outward from the threaded portions of said two rods, said depressions being effective to decrease the major and minor diameters of selected portions of the female threads of said tube while maintaining the pitch of said threads, thereby selectively increasing the frictional engagement between the external threads of said rods and the internal threads of said tube without destroying either of said threads, the said depressions non-circular and having their major axis aligned with the pitch of the said female threads.

5. The method of selectively increasing the torque necessary to adjust a turnbuckle linkage which has male threaded members insertable in a female threaded tube which comprises: threading said male threaded members into said female threaded tube at either end thereof, sequentially forming a plurality of depressions in the outside peripheral wall of said female threaded tube, said depressions effective to change the major and minor diameters of said female threads while maintaining the pitch thereof, forming said depressions with a major and a minor axis, said major axis having a pitch identical to the pitch of said female threads in the areas of said depressions, said depressions being circumferentially discontinuous, and rotating said male threaded members with respect to said female threaded member without damaging any of said threads.

References Cited

UNITED STATES PATENTS

| | | | |
|---|---|---|---|
| 1,626,863 | 5/1927 | Nacey | 151—21X |
| 2,754,871 | 7/1956 | Stoll | 151—21 |
| 2,903,283 | 9/1959 | Sweetland | 287—61 |
| 3,065,983 | 11/1962 | Flumerfelt | 29—175X |
| 3,229,999 | 1/1966 | Storch | 287—60 |

JOHN F. CAMPBELL, Primary Examiner

V. A. DIPALMA, Assistant Examiner

U.S. Cl. X.R.

151—21; 287—60